United States Patent
Kanada et al.

(10) Patent No.: US 7,988,227 B2
(45) Date of Patent: Aug. 2, 2011

(54) STRUCTURE FOR FIXING FENDER PANEL IN CAR

(75) Inventors: Kenichi Kanada, Kariya (JP); Ryoichi Yamamoto, Kariya (JP)

(73) Assignee: Toyota Shatai Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 12/918,994

(22) PCT Filed: Jan. 29, 2009

(86) PCT No.: PCT/JP2009/051457
§ 371 (c)(1),
(2), (4) Date: Nov. 17, 2010

(87) PCT Pub. No.: WO2009/150863
PCT Pub. Date: Dec. 17, 2009

(65) Prior Publication Data
US 2011/0049934 A1    Mar. 3, 2011

(30) Foreign Application Priority Data

Jun. 10, 2008   (JP) .................................. 2008-151805

(51) Int. Cl.
*B62D 24/00* (2006.01)
(52) U.S. Cl. ...................... 296/198; 296/30; 296/193.05
(58) Field of Classification Search .................. 296/198, 296/191, 193.05, 30, 29
See application file for complete search history.

(56) References Cited

U.S. PATENT DOCUMENTS

| 4,717,197 A | * | 1/1988 | Harasaki | 296/193.05 |
| 4,900,083 A | * | 2/1990 | Kumasaka et al. | 296/29 |
| 5,092,649 A | * | 3/1992 | Wurl | 296/29 |
| 5,655,811 A | | 8/1997 | Sekine et al. | |
| 2007/0262615 A1 | * | 11/2007 | Koizumi et al. | 296/201 |

FOREIGN PATENT DOCUMENTS

| JP | 08-020362 | 1/1996 |
| JP | 2005-096502 | 4/2005 |
| JP | 2006-213295 | 8/2006 |

* cited by examiner

*Primary Examiner* — Lori L Lyjak
(74) *Attorney, Agent, or Firm* — Patterson Thuente Christensen Pedersen P.A.

(57) ABSTRACT

In a fender panel fixing structure of a passenger vehicle according to the present invention, a notch portion of a fender panel is provided with a first flat plate-shaped projection strip that is capable of being inserted into a space between an upper end periphery of a fixed window and a side body and has an engagement portion, and a second flat plate-shaped projection strip that is capable of being inserted into a space between a lower end periphery of the fixed window and the side body and has an engagement portion. The side body has a first engaging portion and a second engaging portion that are disposed in portions covered by the upper end periphery and the lower end periphery of the fixed window. The first and second engaging portions are respectively capable of engaging the first flat plate-shaped projection strip and the second flat plate-shaped projection strip.

4 Claims, 5 Drawing Sheets

STRUCTURE FOR FIXING FENDER PANEL IN CAR

PRIORITY CLAIM

The present application is a National Phase entry of PCT Application No. PCT/JP2009/051457, filed Jan. 29, 2009, which claims priority from Japanese Patent Application Number 2008-151805, filed Jun. 10, 2008, the disclosures of which are hereby incorporated by reference herein in their entirety.

TECHNICAL FIELD

The present invention relates to a fender panel fixing structure of a passenger vehicle in which a triangular fixed window is attached to a side body positioned in a front side of a front door and in which a front acute angled portion of the fixed window is fitted into an acute angled notch portion that is formed in an upper rear end of a fender panel covering the side body.

BACKGROUND ART

A related conventional fender panel fixing structure of a passenger vehicle is described in JP 2005-96502A.

As shown in FIG. 5, a fender panel 100 of a passenger vehicle is provided with a flat plate-shaped projection strip 103 that is positioned in an upper periphery of a notch portion 101 formed therein. The projection strip 103 has a hook-shaped engagement portion 104 that is formed in a distal end portion thereof. The projection strip 103 is constructed to be inserted into a space between a triangular fixed window (not shown) and a side body (not shown), so that the engagement portion 104 formed in the distal end portion thereof engages a clip 108 that is secured in the space. Thus, a circumferential periphery of the notch portion 101 of the fender panel 100 can be secured to the side body, so that rattle cannot be easily generated around the circumferential periphery of the notch portion 101, e.g., when the vehicle is moving.

DISCLOSURE OF THE INVENTION

Problem to be Solved by the Invention

For example, when the triangular fixed window should be longitudinally elongated with a design change, the notch portion 101 of the fender panel 100 must also be longitudinally elongated. However, in the fixing structure of the fender panel 100 described above, the circumferential periphery of the notch portion 101 can be secured to the side body at a single portion (the projection strip 103) that is positioned in an upper side thereof. Therefore, if the notch portion 101 is enlarged, the rattle can be easily generated around a lower side portion that is spaced from an upper side securing portion (the projection strip 103).

Therefore, there is a need in the art to reliably support a circumferential periphery of the notch portion of a fender panel that is fitted to a front acute angled portion of a fixed window, thereby restricting generation of rattle therein.

SUMMARY OF THE INVENTION

In one aspect of the present invention, a fender panel fixing structure of a passenger vehicle is provided. In the fender panel fixing structure, a triangular fixed window is attached to a side body positioned in a front side of a front door and a front acute angled portion of the fixed window is fitted into an acute angled notch portion that is formed in an upper rear end of a fender panel covering the side body. The notch portion of the fender panel is provided with a first flat plate-shaped projection strip that is capable of being inserted into a space between an upper end periphery of the fixed window and the side body and has an engagement portion, and a second flat plate-shaped projection strip that is capable of being inserted into a space between a lower end periphery of the fixed window and the side body and has an engagement portion. The side body has a first engaging portion and a second engaging portion that are disposed in portions covered by the upper end periphery and the lower end periphery of the fixed window. The first and second engaging portions are capable of respectively engaging the engagement portion of the first flat plate-shaped projection strip and the engagement portion of the second flat plate-shaped projection strip. The engagement portion of the first flat plate-shaped projection strip and the engagement portion of the second flat plate-shaped projection strip are constructed to respectively engage the first engaging portion and the second engaging portion when the fender panel is moved in a given direction while the first flat plate-shaped projection strip and the second flat plate-shaped projection strip of the fender panel are respectively inserted into the spaces between the fixed window and the side body.

According to the aspect, the first flat plate-shaped projection strip and the second flat plate-shaped projection strip are formed in the notch portion of the fender panel. Further, the engagement portion of the first flat plate-shaped projection strip is constructed to engage the first engaging portion within the space between the upper end periphery of the fixed window and the side body. Further, the engagement portion of the second flat plate-shaped projection strip is constructed to engage the second engaging portion within the space between the lower end periphery of the fixed window and the side body. That is, because the circumferential periphery of the notch portion of the fender panel can be connected to the side body via upper and lower sides of the fixed window, the circumferential periphery of the notch portion can be reliably supported from above and below. Therefore, even if the notch portion is enlarged, rattle cannot be easily generated therein.

Further, the engagement portion of the first flat plate-shaped projection strip and the engagement portion of the second flat plate-shaped projection strip are constructed to respectively engage the first engaging portion and the second engaging portion when the fender panel is moved in a given direction. Therefore, if a plurality of flat plate-shaped projection strips are formed in the notch portion of the fender panel, an attaching operation of the fender panel can be performed without any problem.

In another aspect of the present invention, the notch portion of the fender panel is provided with a guide projection strip that is continuous with the second flat plate-shaped projection strip along a circumferential periphery of the notch portion. The engagement portion of the first flat plate-shaped projection strip and the engagement portion of the second flat plate-shaped projection strip are constructed to move to positions in which the engagement portions can respectively engage the first engaging portion and the second engaging portion when the fender panel is moved rearwardly while sliding an outer surface of the guide projection strip relative to a receiving portion formed in the fixed window in a condition in which the first flat plate-shaped projection strip and the second flat plate-shaped projection strip are respectively inserted into the spaces between the fixed window and the side body.

That is, the engagement portion of the first flat plate-shaped projection strip and the engagement portion of the second flat plate-shaped projection strip are constructed to move to positions in which they can respectively engage the first engaging portion and the second engaging portion when the fender panel is moved rearwardly while sliding the outer surface of the guide projection strip relative to the receiving portion of the fixed window. Therefore, the circumferential periphery of the notch portion of the fender panel cannot be displaced outwardly relative to the fixed window, so as to be prevented from being interfered with the fixed window while the fender panel is being moved. Thus, for example, the fender panel can be easily replaced with a new one.

In a further aspect of the present invention, the engagement portion of the first flat plate-shaped projection strip and the engagement portion of the second flat plate-shaped projection strip respectively have substantially U-shaped notches that are opened in the same direction. The first engaging portion and the second engaging portion respectively have shaft-shaped portions which engage the substantially U-shaped notches.

Therefore, an engagement structure of the engagement portions of the first and second flat plate-shaped projection strips and the first and second engaging portions can be simplified.

According to the present invention, the circumferential periphery of the notch portion of the fender panel can be secured to the side body via upper and lower sides of the fixed window. Therefore, the circumferential periphery of the notch portion can be reliably supported. As a result, even if the notch portion is enlarged, rattle cannot be easily generated therein.

DETAILED DESCRIPTION OF THE INVENTION

Figure 1:
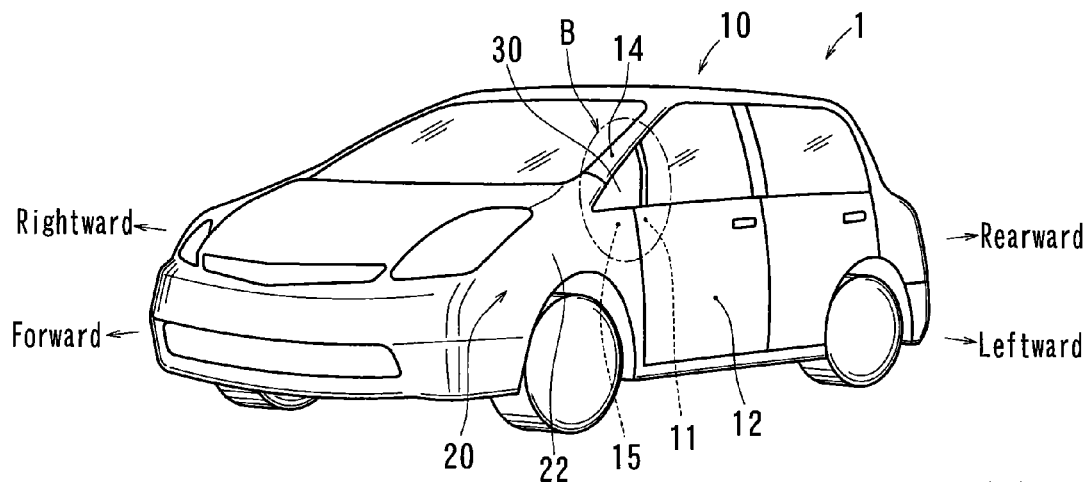
FIG. 1(A) is a front pictorial perspective view of a passenger vehicle having a fender panel fixing structure according to Embodiment 1 of the present invention.
FIG. 1(B) is an enlarged side view of a portion B in Figure A.
Figure 1:
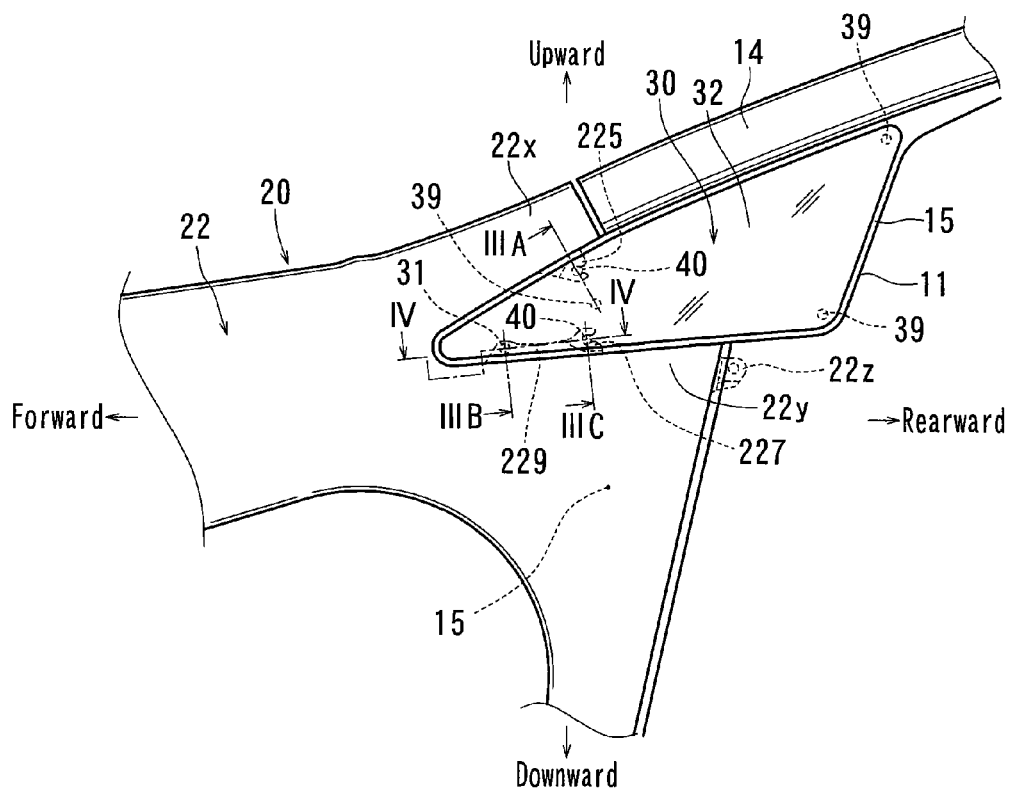

In the following, a fender panel fixing structure of a passenger vehicle according to Embodiment 1 of the present invention will be described with reference to FIG. 1(A) to FIG. 4(B).

Further, forward and rearward, rightward and leftward, and upward and downward in the drawings respectively correspond to forward and rearward, rightward and leftward, and upward and downward of the passenger vehicle.

<Regarding Outline of Front Side Surface of Body 10>

As shown in FIGS. 1(A) and 1(B), a front side surface of a body 10 of a passenger vehicle 1 is provided with a front pillar 14 and a side body 15 (not shown). The front pillar 14 and the side body 15 define a front end periphery of a door opening 11 that can be closed and opened by a front door 12. The side body 15 is disposed below the front pillar 14. The side body 15 is constructed to support a fender panel 22 from inside while the side body 15 is covered by the fender panel 22. An opening (not shown) is formed in a boundary portion of the front pillar 14 and the side body 15. The opening is closed by a triangular fixed window 30. As shown in FIG. 1(A), the fixed window 30 is positioned in a front side of a window frame of the front door 12.

Figure 2:
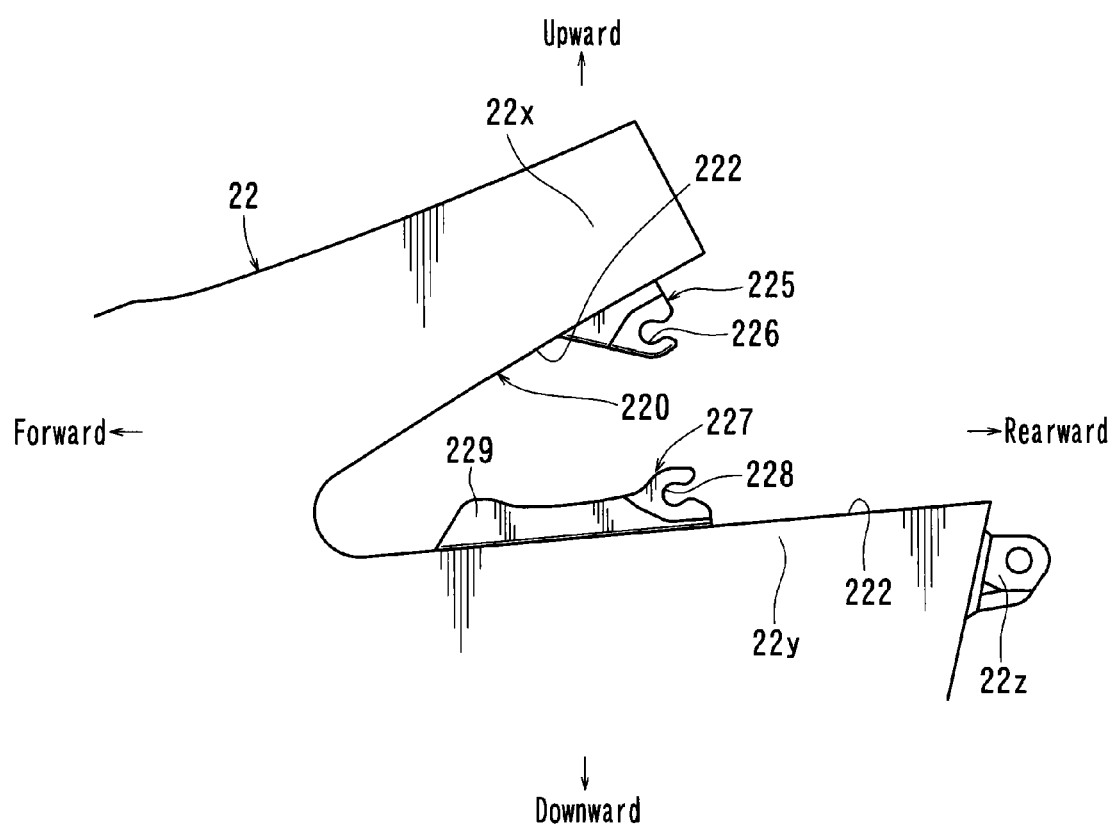
FIG. 2 is a side view of an upper rear end of a fender panel.

The fender panel 22 is a panel that constitutes an outer envelope of a fender 20 of the passenger vehicle 1. As shown in FIG. 2, formed in an upper rear end of the fender panel 22 is a substantially V-shaped notch portion 220 of which the rearward portion is opened. Further, a front acute angled portion of the fixed window 30 is fitted into the notch portion 220 of the fender panel 22 (FIG. 1(B)).

<Regarding Fixed Window 30>

Figure 3:
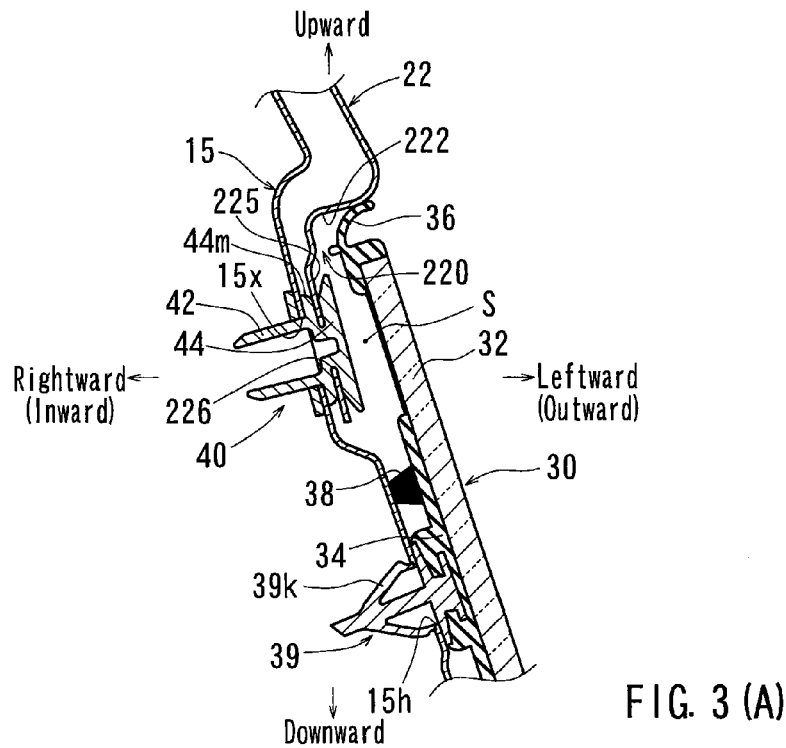
FIG. 3(A) is a cross-sectional view taken along line IIIA of FIG. 1(B).
FIG. 3(B) is a cross-sectional view taken along line IIIB of FIG. 1(B).
FIG. 3(C) is a cross-sectional view taken along line IIIC of FIG. 1(B).
Figure 3:
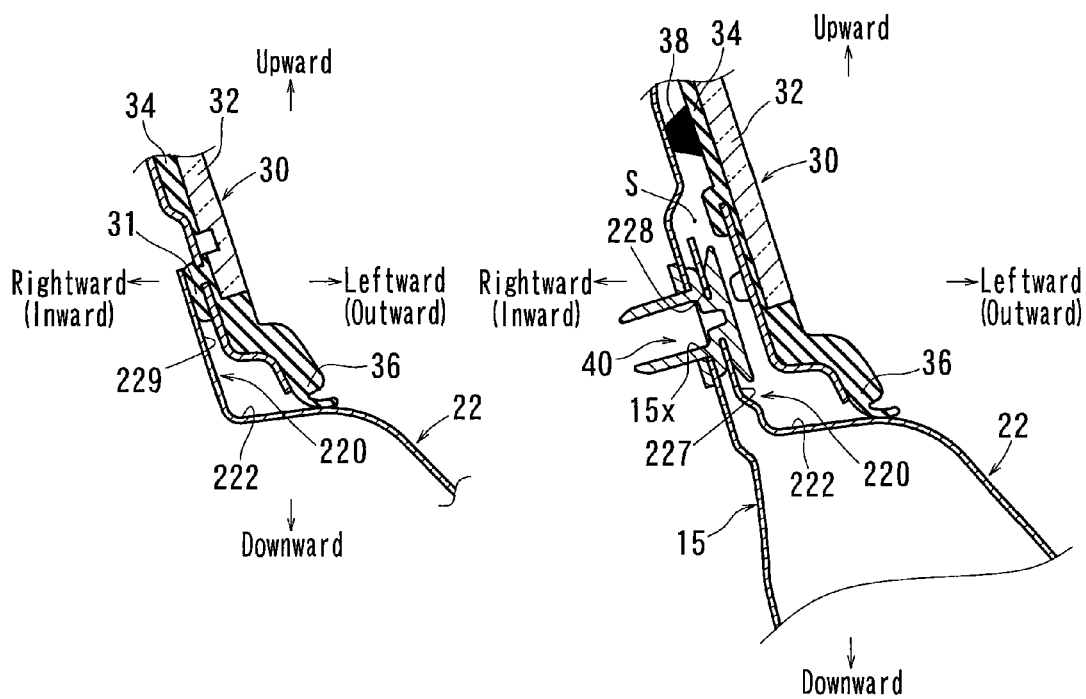
Figure 4:
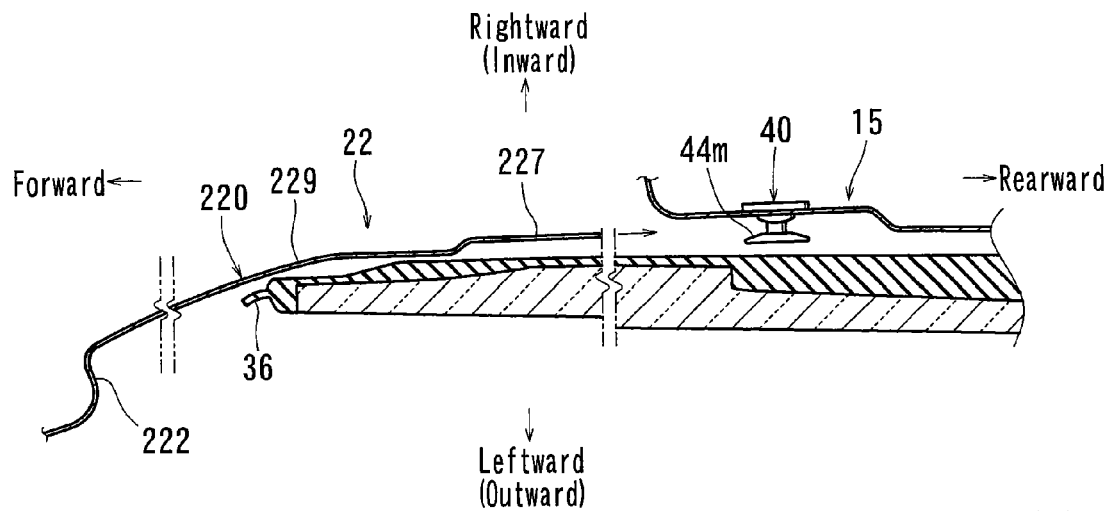
FIG. 4(A) is a transverse cross-sectional view, which illustrates a condition in which a second flat plate-shaped projection strip and a guide projection strip are being inserted into a space between a fixed window and a side body.
FIG. 4(B) is a cross-sectional view taken along line IV-IV of FIG. 1(B).
Figure 4:
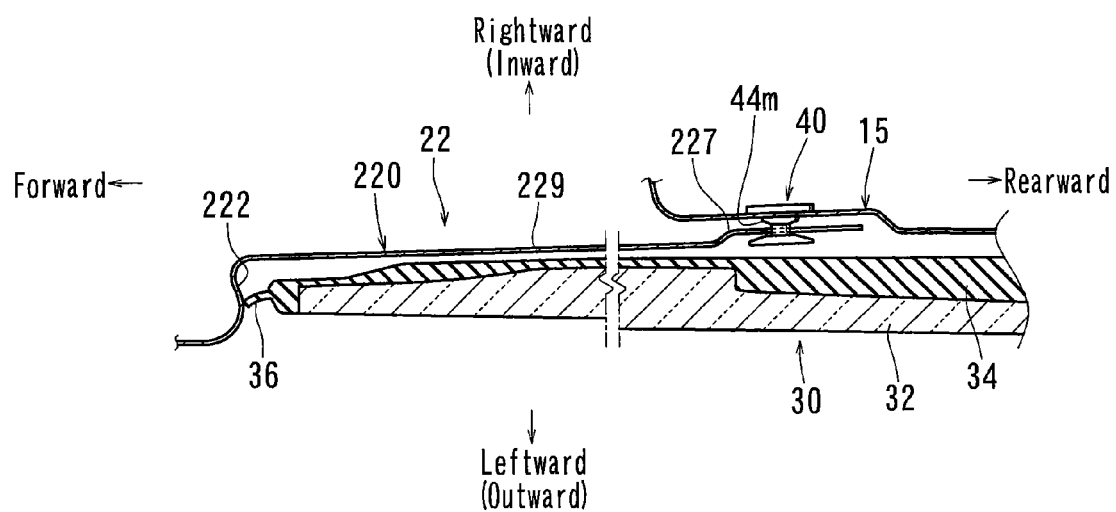
Figure 5:
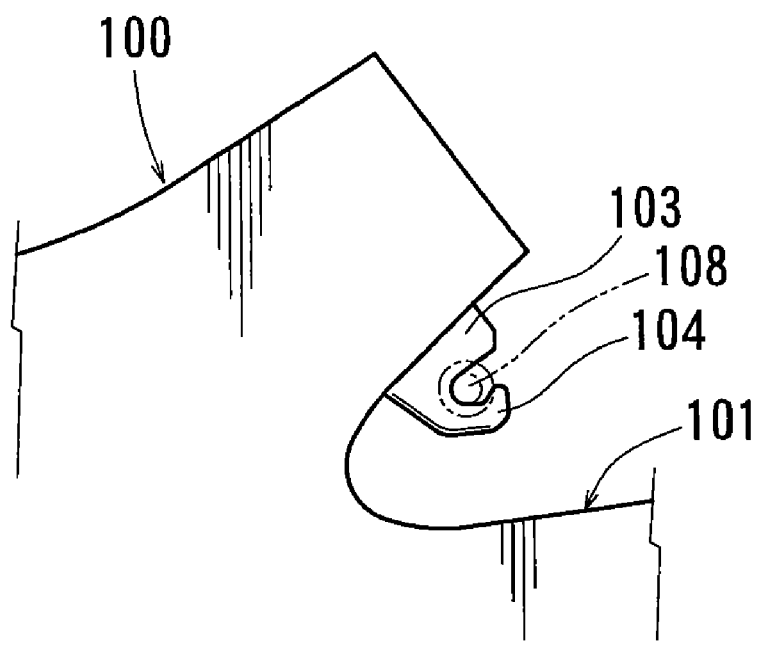
FIG. 5 is a side view of an upper rear end of a conventional fender panel.

The fixed window 30 is constructed of a transparent triangular window body portion 32, and an opaque resin portion 34 and a rubber sealing portion 36, which are shown in FIGS. 3(A) to 4(B). The resin portion 34 is laminated on an inner side end periphery of the window body portion 32. The sealing portion 36 is formed in a circumferential periphery of the window body portion 32. Further, window clips 39 are fixedly connected to the resin portion 34 of the fixed window 30, so as to be projected perpendicular to an inner surface of the window body portion 32. The window clips 39 are resin clips to attach the fixed window 30 to the side body 15. As shown in FIG. 1(B), the window clips 39 are disposed in a rear upper end position, a rear lower end position and a front central position of the fixed window 30. As shown in FIG. 3(A), the window clips 39 respectively have hooked distal end portions 39k that are capable of elastically spreading. The hooked distal end portions 39k are respectively constructed to be spread after they are inserted into through holes 15h formed in the side body 15, thereby engaging inner circumferential peripheries of the through holes 15h. That is, upon insertion of the three window clips 39 into the through holes 15h of the side body 15, the fixed window 30 can be secured to the side body 15. Further, the resin portion 34 of the fixed window 30 is adhered to a circumferential periphery of the opening of the side body 15 via an adhesive 38.

<Regarding Fixing Structure of Fender Panel 22>

As shown in FIGS. 3(A) and 3(C), the side body 15 has spaces S that are formed in portions covered by end peripheries of the fixed window 30. The spaces S are positioned outside relative to the window clips 39 and the adhesives 38. Further, fender panel clips 40 are disposed in portions corresponding to the spaces S and are connected to the side body 15. The fender panel clips 40 are respectively positioned above and below the window clip 39 that is disposed in the front central position of the fixed window 30.

As shown in FIG. 3(A), the fender panel clips 40 respectively have retainer portions 42 that can be inserted into and connected to through holes 15x formed in the side body 15, and disk-shaped head portions 44. Further, in a condition that the retainer portions 42 of the fender panel clips 40 are inserted into and connected to the through holes 15x of the side body 15, the disk-shaped head portions 44 can be vertically secured in the spaces S between the side body 15 and the fixed window 30. Each of the head portions 44 of the fender panel clips 40 has a ring-shaped deep groove 44m that is formed in an outer circumferential surface thereof. Further, formed in a bottom portion of the deep groove 44m is a shaft-shaped portion that is capable of engaging an engagement portion of a first flat plate-shaped projection strip 225 (an engagement portion of a second flat plate-shaped projection strip 227) which will be hereinafter described. The deep groove 44m is formed to be spread and opened in a V-shape in cross section toward an opening side thereof. Therefore, for example, even if the engagement portion of the first flat plate-shaped projection strip 225 is axially displaced to a certain degree relative to the head portion 44 of the fender panel clips 40, the engagement portion of the first flat plate-shaped projection strip 225 is capable of engaging the shaft-shaped portion of the deep groove 44m (hereinafter simply referred to as the deep groove 44m) with the aid of a spread portion having a V-shape in cross section.

As shown in FIG. 2, formed in the upper rear end of the fender panel 22 are a pillar covering portion 22x that covers a lower portion of the front pillar 14, and a body covering portion 22y that covers an upper end periphery of the side body 15. Further, formed between the pillar covering portion 22x and the body covering portion 22y is the notch portion 220 into which a front portion of the fixed window 30 is fitted.

As shown in FIGS. 3(A) to 3(C), the notch portion 220 has a shoulder portion 222 that is formed by inwardly folding a circumferential periphery thereof. The shoulder portion 222 is constructed to contact the sealing portion 36 of the fixed window 30 in a watertight condition. Further, in an upper side (a side corresponding to the pillar covering portion 22x) of the notch portion 220, the first flat plate-shaped projection strip 225 is formed in a far side end position of the shoulder portion 222. As shown in FIG. 2, the first flat plate-shaped projection strip 225 is formed by bending and is shaped to be projected downwardly. Conversely, in a lower side (a side corresponding to the body covering portion 22y) of the notch portion 220, the second flat plate-shaped projection strip 227 and a guide projection strip 229 are formed in a far side end position of the shoulder portion 222. The second flat plate-shaped projection strip 227 and the guide projection strip 229 are formed by bending and are shaped to be projected upwardly.

The first flat plate-shaped projection strip 225 is a projection strip that is capable of engaging the upper fender panel clip 40, thereby securing an upper circumferential periphery of the notch portion 220 of the fender panel 22 to the side body 15. As shown in FIG. 3(A), the first flat plate-shaped projection strip 225 is constructed to be inserted into the space S between an upper end periphery of the fixed window 30 and the side body 15 from before. Further, as shown in FIG. 2, the engagement portion having a notch 226 is formed in a distal end of the first flat plate-shaped projection strip 225. The notch 226 of the engagement portion has a substantially U-shape that is rearwardly opened. That is, the notch 226 of the first flat plate-shaped projection strip 225 is constructed to engage the deep groove 44m of the upper fender panel clip 40 from before.

Therefore, the upper fender panel clip 40 corresponds to a first engaging portion of the present invention.

The second flat plate-shaped projection strip 227 is a projection strip that is capable of engaging the lower fender panel clip 40, thereby securing a lower circumferential periphery of the notch portion 220 of the fender panel 22 to the side body 15. As shown in FIG. 3(C), the second flat plate-shaped projection strip 227 is constructed to be inserted into the space S between a lower end periphery of the fixed window 30 and the side body 15 from before. Further, the engagement portion having a notch 228 is formed in a distal end of the second flat plate-shaped projection strip 227. The notch 228 of the engagement portion has a substantially U-shape that is directed and opened in the same direction as the notch 226 of the first flat plate-shaped projection strip 225 (FIG. 2). That is, the notch 228 of the second flat plate-shaped projection strip 227 is constructed to engage the deep groove 44m of the lower fender panel clip 40 from before.

Therefore, the lower fender panel clip 40 corresponds to a second engaging portion of the present invention.

The guide projection strip 229 is a portion along which a receiving portion 31 (FIG. 3(B)) formed in a front inner side of the fixed window 30 slides when the fender panel 22 is moved rearwardly while the first flat plate-shaped projection strip 225 and the second flat plate-shaped projection strip 227 are respectively inserted into the spaces S between the fixed window 30 and the side body 15. The guide projection strip 229 is constructed to be continuous with the second flat plate-shaped projection strip 227 along the circumferential periphery (the shoulder portion 222) of the notch portion 220.

<Regarding Attaching Procedure of Fender Panel 22>

In order to attach the fender panel 22 to the side body 15 of the passenger vehicle 1, first, the first flat plate-shaped projection strip 225 and the second flat plate-shaped projection strip 227 formed in the notch portion 220 of the fender panel 22 are respectively inserted into the spaces S between the fixed window 30 and the side body 15 from before. At this time, as shown in FIG. 3(B), an outer surface of the guide projection strip 229 of the fender panel 22 is placed in contact with the receiving portion 31 that is formed in a lower portion of the front inner side of the fixed window 30.

Next, in this condition, the fender panel 22 is moved rearwardly, so as to slide the guide projection strip 229 of the fender panel 22 relative to the receiving portion 31 of the fixed window 30. As a result, as shown in FIG. 4(A), the circumferential periphery of the notch portion 220 of the fender panel 22 cannot be displaced outwardly relative to the fixed window 30. Thus, when the fender panel 22 is moved rearwardly, the circumferential periphery of the notch portion 220 of the fender panel 22 can be prevented from being interfered with the fixed window 30.

Thus, when the fender panel 22 is moved to a position closer to a farthest rear position, the front portion of the fixed window 30 is fitted into the notch portion 220 of the fender panel 22, so that as shown in FIG. 4(B), the notch 226 of the first flat plate-shaped projection strip 225 and the notch 228 of the second flat plate-shaped projection strip 227 respectively engage the deep grooves 44m of the upper and lower fender panel clips 40. That is, the notch 226 of the first flat plate-shaped projection strip 225 and the notch 228 of the second flat plate-shaped projection strip 227 respectively engage the deep grooves 44m of the upper and lower fender panel clips 40, so that the circumferential periphery of the notch portion 220 of the fender panel 22 can be secured to the side body 15.

After the circumferential periphery of the notch portion 220 of the fender panel 22 is secured to the side body 15, a flanged portion (not shown) formed in an upper end periphery of the fender panel 22, a flanged portion 22z (FIG. 2) formed in a rear end periphery of the fender panel 22 or other such portions are secure to the side body 15 with bolts.

Further, the fender panel 22 can be detached from the passenger vehicle 1 by performing an opposite procedure from the procedure described above. That is, upon withdrawal of the fender panel 22 forwardly after the bolts are removed, the notches 226 and 228 of the first and second flat plate-shaped projection strips 225 and 227 of the fender panel 22 can be disengaged from the fender panel clips 40 of the side body 15.

<Regarding Advantages of Fender Panel Fixing Structure According to Present Embodiment>

According to the present embodiment, the first flat plate-shaped projection strip 225 and the second flat plate-shaped projection strip 227 are formed in the notch portion 220 of the fender panel 22. Further, the notch 226 of the first flat plate-shaped projection strip 225 is constructed to engage the upper fender panel clip 40 within the space S between the upper end periphery of the fixed window 30 and the side body 15. Further, the notch 228 of the second flat plate-shaped projection strip 227 is constructed to engage the lower fender panel clip 40 within the space S between the lower end periphery of the fixed window 30 and the side body 15. That is, because the circumferential periphery of the notch portion 220 of the fender panel 22 can be connected to the side body 15 via upper and lower sides of the fixed window 30, the circumferential periphery of the notch portion 220 can be reliably supported from above and below. Therefore, even if the notch portion 220 is enlarged, rattle cannot be easily generated therein.

Further, the notch 226 of the first flat plate-shaped projection strip 225 and the notch 228 of the second flat plate-shaped projection strip 227 are constructed to respectively engage the upper and lower fender panel clips 40 when the fender panel 22 is moved in a given direction (rearwardly). Therefore, if a plurality of first flat plate-shaped projection strips 225 and a plurality of second flat plate-shaped projection strips 227 are respectively formed therein, an attaching operation of the fender panel 22 can be performed without any problem.

Further, the notch 226 of the first flat plate-shaped projection strip 225 and the notch 228 of the second flat plate-shaped projection strip 227 are constructed to move to positions in which they can respectively engage the upper and lower fender panel clips 40 when the fender panel 22 is moved rearwardly while sliding the outer surface of the guide projection strip 229 relative to the receiving portion 31 formed in a front portion of the fixed window 30. Therefore, the circumferential periphery of the notch portion 220 of the fender panel 22 cannot be displaced outwardly relative to the fixed window 30, so as to be prevented from being interfered with the fixed window while the fender panel 22 is being moved. Thus, the fender panel 22 can be easily replaced with a new one.

Further, the engagement portions of the first flat plate-shaped projection strip 225 and the second flat plate-shaped projection strip 227 respectively have the substantially U-shaped notches 226 and 228 that are opened in the same direction. Also, the upper and lower fender panel clips 40 respectively have the deep grooves 44m which engage the substantially U-shaped notches 226 and 228. Therefore, an engagement structure of the first and second flat plate-shaped projection strips 225 and 227 and the fender panel clips 40 can be simplified.

<Modified Forms>

The present invention is not limited to the embodiment described above and the invention can be modified without departing from the scope thereof. For example, in the embodiment, the guide projection strip 229 of the notch portion 220 of the fender panel 22 is formed to be continuous with the second flat plate-shaped projection strip 227. However, a guide projection strip can be formed to be continuous with the first flat plate-shaped projection strip 225. In such a modified form, a position of the receiving portion 31 of the fixed window is changed so as to correspond to a position of the guide projection strip.

Also, in the embodiment, the notches 226 and 227 of the first flat plate-shaped projection strip 225 and the second flat plate-shaped projection strip 227 respectively engage the upper and lower fender panel clips 40. However, the distal end of each of the first flat plate-shaped projection strip 225 and the second flat plate-shaped projection strip 227 can be shaped to a band plate-shape that extends rearwardly. Conversely, slit-shaped openings can be formed in a surface of the side body 15, so that the distal end of each of the first flat plate-shaped projection strip 225 and the second flat plate-shaped projection strip 227 can be inserted thereinto.

Further, in the embodiment, the two flat plate-shaped projection strips 225 and 227 are provided to the notch portion 220 of the fender panel 22. However, three or more flat plate-shaped projection strips can be provided thereto.

Further, in the embodiment, the upper and lower fender panel clips 40 are constructed to support only the fender panel 22. However, the fender panel clips 40 can be constructed to support the fixed window 30 as well as the fender panel 22.

The invention claimed is:

1. A fender panel fixing structure of a passenger vehicle in which a triangular fixed window is attached to a side body positioned in a front side of a front door and in which a front acute angled portion of the fixed window is fitted into an acute angled notch portion that is formed in an upper rear end of a fender panel covering the side body, wherein the notch portion of the fender panel is provided with a first flat plate-shaped projection strip that is capable of being inserted into a space between an upper end periphery of the fixed window and the side body and has an engagement portion, and a second flat plate-shaped projection strip that is capable of being inserted into a space between a lower end periphery of the fixed window and the side body and has an engagement portion, wherein the side body has a first engaging portion and a second engaging portion that are disposed in portions covered by the upper end periphery and the lower end periphery of the fixed window, the first and second engaging portions being capable of respectively engaging the engagement portion of the first flat plate-shaped projection strip and the engagement portion of the second flat plate-shaped projection strip, and wherein the engagement portion of the first flat plate-shaped projection strip and the engagement portion of the second flat plate-shaped projection strip are constructed to respectively engage the first engaging portion and the second engaging portion when the fender panel is moved in a given direction while the first flat plate-shaped projection strip and the second flat plate-shaped projection strip of the fender panel are respectively inserted into the spaces between the fixed window and the side body.

2. A fender panel fixing structure of a passenger vehicle as defined in claim 1, wherein the notch portion of the fender panel is provided with a guide projection strip that is continuous with the second flat plate-shaped projection strip along a circumferential periphery of the notch portion, and wherein the engagement portion of the first flat plate-shaped projection strip and the engagement portion of the second flat plate-shaped projection strip are constructed to move to positions in which the engagement portions can respectively engage the first engaging portion and the second engaging portion when the fender panel is moved rearwardly while sliding an outer surface of the guide projection strip relative to a receiving portion formed in the fixed window in a condition in which the first flat plate-shaped projection strip and the second flat plate-shaped projection strip are respectively inserted into the spaces between the fixed window and the side body.

3. A fender panel fixing structure of a passenger vehicle as defined in claim 1, wherein the engagement portion of the first flat plate-shaped projection strip and the engagement portion of the second flat plate-shaped projection strip respectively have substantially U-shaped notches that are opened in the same direction, and wherein the first engaging portion and the second engaging portion respectively have shaft-shaped portions which engage the substantially U-shaped notches.

4. A fender panel fixing structure of a passenger vehicle as defined in claim 2, wherein the engagement portion of the first flat plate-shaped projection strip and the engagement portion of the second flat plate-shaped projection strip respectively have substantially U-shaped notches that are opened in the same direction, and wherein the first engaging portion and the second engaging portion respectively have shaft-shaped portions which engage the substantially U-shaped notches.

* * * * *